United States Patent Office 2,766,297
Patented Oct. 9, 1956

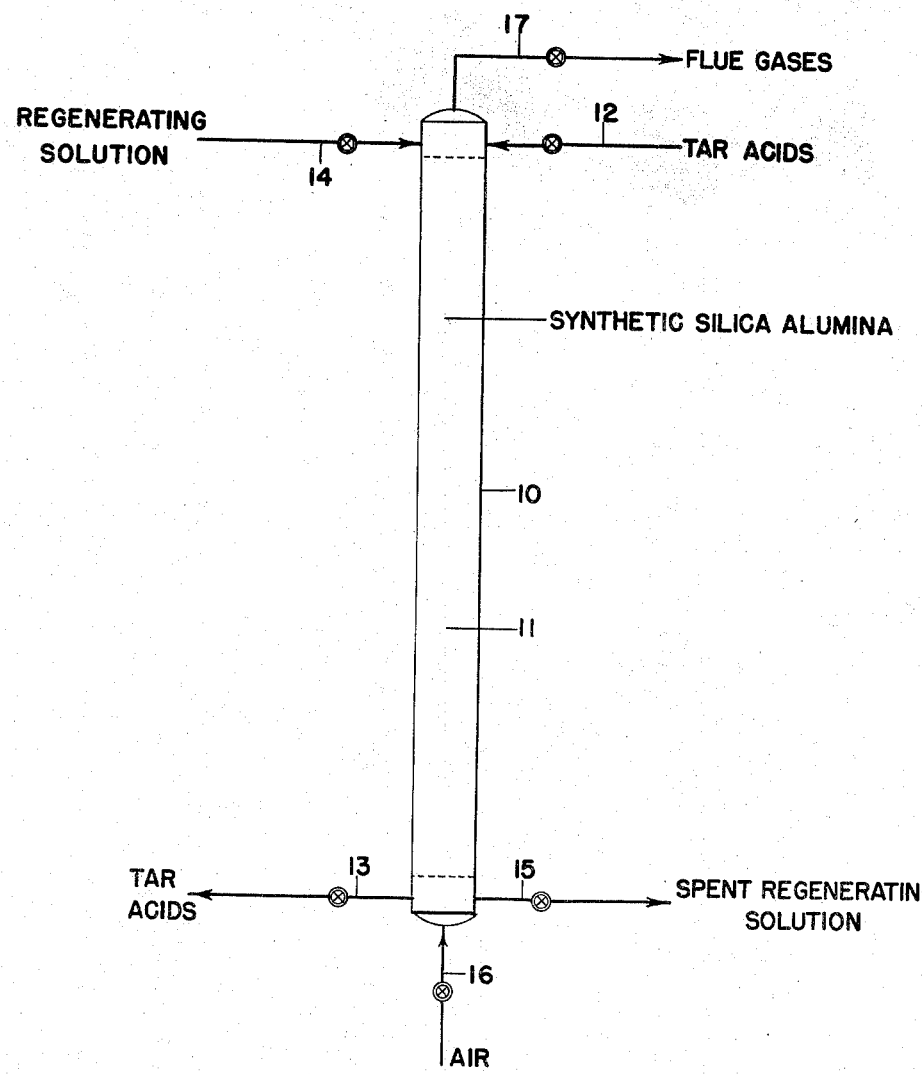

2,766,297
SEPARATION OF TAR ACIDS AND TAR BASES

Martin B. Neuworth, Pittsburgh, Pa., assignor to Pittsburgh Consolidation Coal Company, Pittsburgh, Pa., a corporation of Pennsylvania Application October 23, 1953, Serial No. 388,070

9 Claims. (Cl. 260—627)

This invention relates to a process for removing tar bases from tar acids and more particularly to a process for contacting a mixture of tar acids and tar bases with synthetic silica-alumina to effect a separation of tar bases from the tar acids.

Tar acids and tar bases are found together in the liquid products of distillation of oil shale, coal, coal hydrogenation oils and the like as well as in the so-called petroleum cresylics resulting from the cracking of petroleum. The tar acids are particularly valuable commercially in the production of resins, plasticizers and the like. In such applications, their utility is seriously impaired if they are contaminated by tar bases. Unfortunately the boiling points of the tar acids and the tar bases derived from the above-mentioned sources are in the same range and prevent their effective separation by distillation. Treatment of the mixtures with strong acids is only partially successful in removing the tar bases since a substantial portion of those bases which boil above 200° C. are not removed by the acid.

In copending U. S. patent application Ser. No. 215,376, filed March 13, 1951, by E. Gorin, B. W. Jones and M. B. Neuworth (assigned to the assignee of the present application), now abandoned and replaced by a continuation-in-part application Serial No. 382,866, filed September 28, 1953, a process is disclosed for separating tar bases from a mixture consisting essentially of tar acids and tar bases by contacting the mixture with a cation exchange resin. When the mixture is stable and free of sludge-forming materials, the cation exchange resin can be regenerated as described in the above-mentioned copending application and can be reused over and over again without substantial loss in tar removal capacity.

However the cation exchange resin process is unsatisfactory for the commercial removal of tar bases from mixtures of tar acids which are unstable or which have sludge-forming tendencies. The capacity of a cation resin used with such materials diminishes with each successive cycle of treatment and regeneration; after a very few cycles the resin completely loses its tar base removal capacity and must be discarded. Since cation exchange resins are expensive materials, their use in treating tar acids is of commercial interest only in those situations where they can be regenerated and reused many times without substantial loss of tar base removal capacity. Thus the ion exchange resin process is commercially unattractive for treating sludge-forming tar acids.

I have discovered that synthetic silica-alumina of the type used in petroleum cracking catalysts can be employed to remove tar bases from admixture with tar acids. Although the tar base removal capacity of the silica-alumina is less than that of the best available ion exchange resins, nevertheless the silica-alumina can be commercially competitive with even the best ion exchange resins for use with stable tar acids because of its lower initial costs. Moreover the silica-alumina also has the advantage that it can be used with tar acids which are unstable or sludge-forming because of its superior regenerating qualities. By combustion of the exhausted silica-alumina, its tar base removal capacity can be fully restored without the need for consuming chemical regenerants in the process. Moreover the regeneration is complete regardless of the instability or sludge-forming characteristics of the tar acids.

Commercially valuable tar acids are those boiling below about 300° C., and especially those boiling below about 230° C.

Tar acids boiling below 230° C. include phenol and the isomers of cresol and xylenol, all of which can be considered stable materials. Tar acids boiling above 230° C. contain substituted phenols, bicyclic and dihydric phenols, for example, and are generally referred to as high boiling tar acids. These high boiling tar acids (boiling range 230–300° C.) are less stable than the low boiling tar acids (boiling range 160–230° C.) and have a greater tendency to form sludges or to condense or polymerize. My new process therefore is especially useful in treating mixtures containing high boiling tar acids.

The primary object of this invention is to provide a method for preparing commercially tar acids of marketable purity. To prepare pure tar acids from any known source material (e. g. coal tars, petroleum cresylics and the like) it is necessary to remove substantial quantities of neutral oils and small quantities of tar bases from the source material containing tar acids. Preferably the neutral oils will be eliminated first by any well known method (e. g. the Caustic process). The resulting material contains tar acids, no neutral oils and usually enough tar bases to be objectionable for most commercial tar acids applications. Thus, in the present process, the feed material normally will be free of neutral oils; it will consist essentially of tar acids which are contaminated with tar bases. In some instances it may be desirable to treat the tar acids and tar bases undiluted, although the separation is preferably carried out with the tar acids and tar bases dissolved in an aqueous polar solvent. Where the tar acids have been separated from tar acid oil by the double solvent extraction process set forth in U. S. patent application S. N. 184,474 by E. Gorin and M. B. Neuworth, filed September 12, 1950, and entitled "Refining of Tar Acid Oil," now U. S. Patent 2,666,796, the tar acids stream, containing some tar bases but no neutral oils, leaves the system dissolved in aqueous methanol. Accordingly it is especially adapted to tar base removal by the present process.

Specifically my method of treatment is as follows. The tar acids undergoing treatment should be essentially free of neutral oils. The mixture consisting essentially of tar acids and tar bases can be treated directly or can be dissolved in a polar organic solvent. Examples of satisfactory solvents are methanol, ethanol, propanol, acetone and methyl ethyl ketone. Preferably the polar organic solvent is in an aqueous condition, the amount of water being insufficient to render the tar acids and tar bases insoluble in the polar organic solvent. I have found aqueous methanol to be particularly effective.

The tar acids, directly or preferably in solution, are passed in liquid phase through a bed of granular silica-alumina at a liquid hourly space velocity (LHSV) of about 0.1 to 5.0 for the solution. Synthetic silica-alumina containing from about 1 to 50 weight percent alumina and from about 99 to 50 weight percent silica is satisfactory. Preferably the composition is from about 1 to 20 weight percent alumina and from about 99 to 80 weight percent silica. Commercially available petroleum cracking catalysts which are excellent for these purposes, have about 88 weight percent silica and about 12 weight percent alumina. The silica-alumina may be used in the form of pellets or beads or may be crushed to a coarse powder. Normal atmospheric temperatures in the range of about 50–200° F. are preferred for the contacting stage. As a result of contacting the silica-alumina, tar bases are adsorbed upon its surface and tar acids are discharged from the bed substantially free of tar bases.

With new or freshly regenerated silica-alumina, virtually all the tar bases in the feedstock are removed from the mixture. However as the silica-alumina becomes exhausted through use, trace quantities of the tar bases gradually appear in the effluent stream. When the tar base contamination of the effluent reaches a predetermined level, the flow of contaminated tar acids into the silica-alumina is discontinued and regeneration of the silica-alumina is commenced.

Normally the regeneration is accomplished by eluting the bed with a strong mineral acid such as sulfuric, in solution with an aqueous polar organic solvent. Tar bases are removed by the solution of strong mineral acid and the adsorptive capacity of the silica-alumina is restored. Care should be taken that the regenerant does not contain so much water that the tar bases are insoluble in the solution. Aqueous solutions of mineral acids, without the addition of a polar organic solvent, are ineffective as regenerants for the exhausted silica-alumina. In general the polar organic solvent may be the same one used for diluting the tar acids in the feed stream, and preferably is aqueous methanol. The tar bases are removed by the solution of the strong mineral acid and the adsorptive capacity of the silica-alumina is restored. The extract containing tar bases is removed and, if desired, the tar bases may be recovered.

Following the regeneration treatment, the silica-alumina may be reused for removing tar bases from tar acids.

The relative concentrations of tar acids and tar bases in the original solution do not appear to be critical in the successful practice of this invention. Generally, however, the tar bases are present in a very small amount compared to the tar acids, i. e., up to about 2.0 percent of the weight of the tar acids.

Where the tar acids are unstable or have sludge-forming tendencies, the silica-alumina behaves like the ion exchange resins, i. e., after a very few cycles of treatment and regeneration, the tar base adsorbing capacity diminishes until it cannot be restored by the described elution-type regeneration technique. Nevertheless the exhausted silica-alumina can be completely restored to its initial tar base adsorption capacity by burning the exhausted silica-alumina in air at a temperature of about 900–1200° F.

For a clear understanding of the operation of the present invention, its objects and advantages, reference should be had to the accompanying drawing which is a schematic illustration of apparatus adapted to carry out the present invention. A vertical vessel 10 is provided for maintaining a bed 11 of synthetic silica-alumina cracking catalyst. During the production phase of the cycle, tar acids are introduced through a conduit 12 into the vessel 10 and effluent product is recovered through a conduit 13. The tar acids, contaminated with tar bases, are introduced at 12, preferably dissolved in an aqueous polar organic solvent, such as aqueous methanol. The tar acids recovered at 13 are essentially free of tar base contaminants.

As the silica-alumina in the bed 11 approaches saturation with tar bases, the effluent solution through the conduit 13 will contain some tar bases. When the tar base content of the effluent solution reaches the predetermined allowable maximum content, the production phase of the cycle is terminated and any tar acids remaining in the bed 11 are removed by washing the bed with an aqueous solution of a polar organic solvent such as aqueous methanol.

After the bed 11 is freed of residual tar acids (for example, by rinsing the bed 11 with an aqueous polar organic solvent), a strong acid regenerating solution in an aqueous polar organic solvent is introduced into the column 10 through the conduit 14. This regenerating solution removes most of the tar bases from the synthetic silica-alumina in the bed 11 for recovery through the conduit 15. Under normal conditions the synthetic silica-alumina in the bed 11 can be regenerated in this manner and restored to a condition satisfactory for repeating the production phase of the cycle.

Alternatively the regeneration may be carried out by introducing air into the column 11 to a conduit 16 to cause combustion of the carbonaceous materials deposited on the synthetic silica-alumina cracking catalyst. The vaporous products of combustion are removed from the vessel 10 through the conduit 17. This thermal regeneration of the synthetic silica-alumina, preferably carried out at a temperature of 900 to 1200° F., restores the base removing capacity of the material in the bed 11. Thermal regeneration as described is particularly effective when high boiling tar acids are undergoing treatment in the present process, since these high boiling materials tend to deposit in the bed 11 sludges which cannot be removed fully by the strong acid elution regeneration.

Under some circumstances it may be desirable to regenerate the silica-alumina by the strong acid elution technique for several cycles until the sludge build-up prevents satisfactory restoration of base removal capacity by elution alone. Thereupon the thermal regeneration phase may be substituted for the elution regeneration in a succeeding cycle to effect a total restoration of base removal capacity.

A comparison of the characteristics of silica-alumina against ordinary cation exchange resins for removing tar bases from tar acids is set forth in Table I.

In each instance, the feedstock was an aqueous methanol (70 weight percent methanol, balance water) solution of tar acids contaminated with tar bases. The tar acid content of the feedstock was 27.0 weight percent; the tar base content of the feedstock was 0.22 weight percent. Feedstock was passed downwardly in each of eight runs for treatment with the contacting materials listed in Table I. The treatment cycle in each instance was terminated arbitrarily when the concentration of tar bases reached 0.07 weight percent of the effluent stream from the contacting bed. The tests were conducted at room temperature. The silica-alumina used in these tests was a crushed commercial cracking catalyst (20 to 30 mesh) having about 12 percent by weight of alumina and about 88 percent by weight of silica. The ion exchange resins were prepared by The Rohm and Haas Company under the trade designation "IR-120" which is a sulfonic acid cation resin, and "IRC-50" which is a carboxylic acid cation resin.

A measure of the tar base removal capacity of each contacting material was obtained by using as numerator the volume of feedstock passed over the contacting material prior to termination of the treatment cycle; and as denominator the volume of contacting material. The resulting dividend indicates the volume of the particular feedstock which can be passed over a unit volume of contacting material before the effluent tar base content rises to a value of 0.07 weight percent.

*Table I*

| Contacting Material | Tar Base Removal Capacity, ml. of feedstock/ml. of adsorbent |
|---|---|
| Ion Exchange Resins: | |
| IR-120 (Fresh) | 93–107 |
| IR-120 (Regenerated with methanolic sulfuric acid) | 93–107 |
| IR-120 (After 50th cycle of treatment and regeneration in methanolic sulfuric acid) | 75 |
| IRC-50 (Fresh) | 3.4 |
| Silica-Alumina: | |
| Silica-Alumina (Fresh) | 6.0–6.3 |
| Silica-Alumina (Regenerated with methanolic sulfuric acid) | 6.0–6.3 |
| Silica-Alumina (Regenerated with aqueous sulfuric acid) | 1.96 |
| Silica-Alumina (Regenerated by combustion in air at 900° F.) | 6.0–6.3 |

Table I demonstrates that the capacity of the silica-alumina cracking catalyst for removing tar bases from tar acids is less than that of the best available ion exchange resins. Nevertheless the silica-alumina effectiveness is comparable to that of the ion exchange resin, since both materials were capable of reducing the tar base contamination from 0.22 weight percent to 0.07 weight percent of the feedstock. The silica-alumina capacity can be fully regenerated either by means of aqueous methanolic sulfuric acid elution, or combustion of the exhausted catalyst with air. This regenerative feature makes the silica-alumina material especially attractive for processing tar acids which are unstable or have sludge-forming tendencies. When coated or impregnated with tar acids sludges, the silica-alumina material can be restored to full capacity by simply burning away the deposited sludge, whereas ion exchange resins which have become coated with sludge cannot be restored by any known convenient means, and must therefore be discarded after a very few treatment cycles.

Table I also shows that attempted regeneration of the exhausted silica-alumina with aqueous sulfuric acid restores only about one-third of the original capacity to the material. However the capacity was fully restored when the regenerant was a solution of sulfuric acid in aqueous methanol of such concentration that the tar bases are readily soluble in the solution.

Where the tar acids being treated have only a slight sludge-forming tendency, the capacity of the silica-alumina (as well as that of the conventional ion exchange resins) will decrease with each cycle of base-removal and regeneration. The number of cycles which may be conducted prior to total exhaustion depends upon the relative instability of the tar acids. With silica-alumina, the standard elution-type regeneration may be carried out for several cycles until the base removal capacity of the regenerated material is diminished to a predetermined value. Thereupon the silica-alumina capacity may be fully restored through a combustion-type regeneration.

The acidic character of silica-alumina is well known; in fact, its activity for some purposes is measured by titration of the material with standard caustic solutions; it is frequently characterized as "an acid catalyst." In order to determine whether other "acid catalysts" would be satisfactory for removing tar bases from tar acids, several other materials having properties generally similar to silica-alumina were tested. It was found that these available materials, which are generally similar to silica-alumina, possessed no tar base removal capacity whatsoever. One of the materials was a polymerization catalyst (phosphoric acid catalyst); another was a zeolite resin sold commercially as Permutit "Decalso"; a commercial silica-magnesia cracking catalyst also showed no capacity whatsoever for removing tar bases from tar acids.

According to the provisions of the patent statutes, I have explained the principle, preferred construction, and mode of operation of my invention and have illustrated and described what I now consider to represent its best embodiment. However, I desire to have it understood that, within the scope of the appended claims, the invention may be practiced otherwise than as specifically illustrated and described.

I claim:

1. The method of separating tar acids and tar bases from a mixture consisting essentially of tar acids and tar bases, which comprises passing said mixture in liquid phase in intimate contact with synthetic silica-alumina cracking catalyst comprising 1 to 50 weight percent alumina and 99 to 50 weight percent silica, whereby said tar bases are adsorbed upon said synthetic silica-alumina cracking catalyst, and recovering the effluent liquid containing tar acids substantially free of tar bases.

2. The method of separating tar acids and tar bases which comprises passing a mixture consisting essentially of tar acids and tar bases, in an organic polar solvent selected from the class consisting of methanol, ethanol, propanol, acetone and methyl ethyl ketone, in intimate contact with synthetic silica-alumina cracking catalyst comprising 1 to 50 weight percent alumina and 99 to 50 weight percent silica, whereby said tar bases are adsorbed upon said synthetic silica-alumina cracking catalyst, and recovering the effluent solution containing tar acids substantially free of tar bases.

3. The method of claim 2 in which the said synthetic silica-alumina cracking catalyst comprises 1 to 20 weight percent of alumina and 99 to 80 weight percent of silica.

4. The method of claim 2 in which the organic polar solvent is methanol.

5. The method of separating tar acids and tar bases which comprises cyclically first passing a mixture consisting essentially of tar acids and tar bases, in an organic polar solvent selected from the class consisting of methanol, ethanol, propanol, acetone and methyl ethyl ketone, in intimate contact with synthetic silica-alumina cracking catalyst comprising 1 to 50 weight percent alumina and 99 to 50 weight percent silica, whereby said tar bases are adsorbed upon said synthetic silica-alumina cracking catalyst, recovering the effluent solution containing tar acids substantially free of tar bases, and secondly regenerating said synthetic silica-alumina cracking catalyst after it has become substantially saturated with tar bases by passing a solution of sulfuric acid in an aqueous organic polar solvent selected from the class consisting of methanol, ethanol, propanol, acetone and methyl ethyl ketone over the said synthetic silica-alumina cracking catalyst, and thereafter repeating the cycle.

6. The method of claim 5 in which the aqueous organic polar solvent is aqueous methanol.

7. The method of separating tar acids from tar bases which comprises cyclically first passing a mixture consisting essentially of tar acids and tar bases, in an organic polar solvent selected from the class consisting of methanol, ethanol, propanol, acetone and methyl ethyl ketone, in intimate contact with synthetic silica-alumina cracking catalyst comprising 1 to 50 weight percent alumina and 99 to 50 weight percent silica, whereby said tar bases are adsorbed upon said synthetic silica-alumina cracking catalyst comprising 1 to 50 weight percent alumina and 99 to 50 weight percent silica, recovering the effluent solution containing tar acids substantially free of tar bases, and secondly regenerating said synthetic silica-alumina cracking catalyst by heating said synthetic silica-alumina cracking catalyst to 900 to 1200° F. in the presence of air, and thereafter repeating the cycle.

8. The method of separating tar acids from tar bases which comprises maintaining a bed of synthetic silica-alumina cracking catalyst, passing cyclically first a mixture consisting essentially of tar acids and tar bases, in an organic polar solvent selected from the class consisting of methanol, ethanol, propanol, acetone and methyl ethyl ketone, through said bed, whereby tar bases are retained in said bed, recovering tar acids substantially free of tar bases in the effluent stream, terminating the passage of said mixture through said bed when the tar base content of the effluent stream increases to a predetermined value, and secondly regenerating said synthetic silica-alumina cracking catalyst by passing air therethrough at a temperature of 900 to 1200° F. until substantially all the deposited material has been burned from said synthetic silica-alumina cracking catalyst, and thereafter repeating the cycle.

9. The method of separating tar acids and tar bases which comprises cyclically, first passing a mixture consisting essentially of tar acids and tar bases in an aqueous organic polar solvent selected from the class consisting of methanol, ethanol, propanol, acetone and methyl ethyl ketone, in intimate contact with synthetic silica-alumina cracking catalyst comprising 1 to 50 weight percent alumina and 99 to 50 weight percent silica, whereby said tar bases are retained upon said synthetic silica-alumina cracking catalyst, recovering the effluent solution containing tar acids substantially free of tar bases, and thereafter secondly regenerating said synthetic silica-alumina cracking catalyst by passing a solution of sulfuric acid in an aqueous organic polar solvent selected from the class consisting of methanol, ethanol, propanol, acetone and methyl ethyl ketone, in intimate contact with said synthetic silica-alumina cracking catalyst, and thirdly repeating said cycle until the base removal capacity of said synthetic silica-alumina cracking catalyst immediately following a regenerating treatment has a predetermined minimum value, thereafter passing said mixture of tar acids and tar bases in intimate contact with the said synthetic silica-alumina cracking catalyst as before and thereafter heating said synthetic silica-alumina cracking catalyst to a temperature of 900 to 1200° F. in the presence of air until substantially all the deposited material has been burned from said synthetic silica-alumina cracking catalyst, and thereafter repeating the cyclic process already described.

References Cited in the file of this patent

UNITED STATES PATENTS

| | | |
|---|---|---|
| 1,961,890 | Miller et al. | June 5, 1934 |
| 2,291,419 | Strickland | July 28, 1942 |
| 2,636,845 | Richardson et al. | Apr. 28, 1953 |

FOREIGN PATENTS

| | | |
|---|---|---|
| 389,517 | Great Britain | Mar. 13, 1933 |

OTHER REFERENCES

Hackh's Chemical Dictionary, 3rd ed., 1944, pp. 102 and 921.